(12) United States Patent
Wang

(10) Patent No.: US 6,450,519 B1
(45) Date of Patent: Sep. 17, 2002

(54) WAIST-TWISTING LEISURE BIKE

(76) Inventor: Ping Tien Wang, 15/F., No. 135, Ching Tung Street, East District, Tainan (TW)

( * ) Notice: Subject to any disclaimer, the term of this patent is extended or adjusted under 35 U.S.C. 154(b) by 0 days.

(21) Appl. No.: 10/038,666

(22) Filed: Jan. 8, 2002

(51) Int. Cl.[7] .................. B62K 13/00; B62K 15/00; B62K 21/00
(52) U.S. Cl. .................. 280/266; 280/272; 280/287
(58) Field of Search ................ 280/263, 266, 280/267, 268, 272, 271, 278, 287

(56) References Cited

U.S. PATENT DOCUMENTS

| | | | |
|---|---|---|---|
| 432,920 A | * | 7/1890 | Wittig |
| 449,383 A | * | 3/1891 | Rathbun |
| 4,219,209 A | * | 8/1980 | Haack .................. 280/278 |
| 4,506,902 A | * | 3/1985 | Maebe .................. 280/266 |
| 5,590,895 A | * | 1/1997 | Hiramoto .................. 280/287 |
| 6,082,754 A | * | 7/2000 | Jeunet et al. .................. 280/272 |
| 6,116,629 A | * | 9/2000 | Koppensteiner .................. 280/278 |
| 6,267,401 B1 | * | 7/2001 | De Jong .................. 280/287 |

FOREIGN PATENT DOCUMENTS

| GB | 368 | * 11/1887 | .................. 280/266 |
|---|---|---|---|

* cited by examiner

*Primary Examiner*—Anne Marie Boehler
(74) *Attorney, Agent, or Firm*—Bacon & Thomas, PLLC

(57) ABSTRACT

A waist-twisting leisure bike includes a front body frame, a rear body frame, and a lateral frame. The front body frame has a handle, a support rod, a front fork tube, a front fork base, a front fork and a front wheel. The rear body frame has a driving device, a seat and a rear wheel. The lateral frame consists of a first and a second lateral frame respectively connected to the front body frame and the rear body frame. The first and the second lateral frame are pivotally connected to each other. Then a rider can twist the waist for changing swaying angle of the first and the second lateral frame so as to change the moving direction of the bike. So the bike in the invention can move by pedaling but also be used for waist-twisting exercise as well.

1 Claim, 7 Drawing Sheets

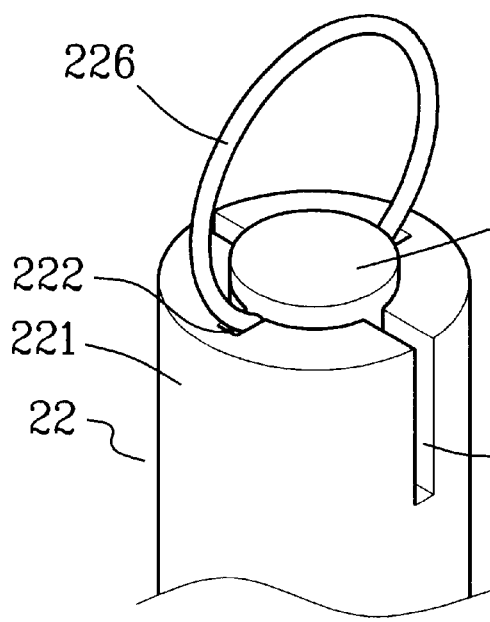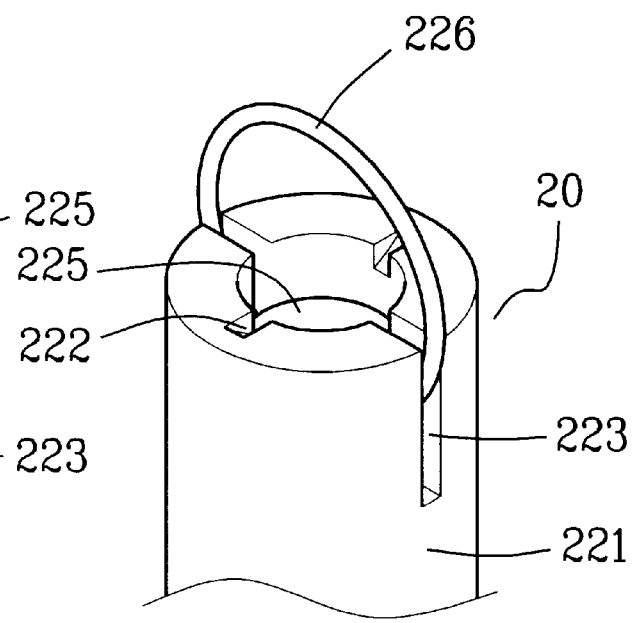
*FIG. 7*  *FIG. 8*
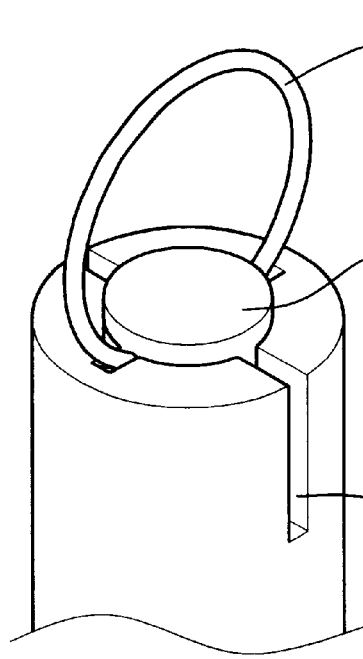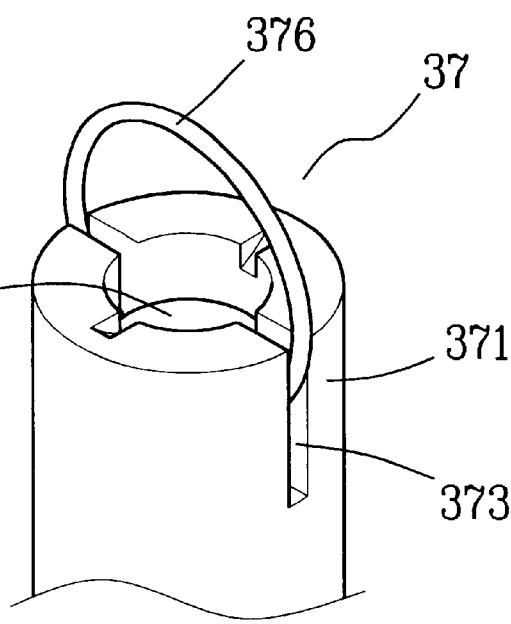
*FIG. 9*  *FIG. 10*

WAIST-TWISTING LEISURE BIKE

BACKGROUND OF THE INVENTION

This invention relates to a waist-twisting leisure bike, particularly to one provided with a first lateral frame and a second lateral frame connected pivotally with each other so that the first and the second lateral frame can rotate freely to each other to let a rider twist the waist to control moving direction of the bike.

Riding a bike is a kind of leisure exercise by pedaling to move a chain to rotate a rear wheel so as to run a bike forward. Then the direction of a bike is controlled with a handle. From the standpoint of human dynamic exercise effect, riding a bike is to strengthen the heart and lung of a rider by repeating pedaling. Although there are many kinds of bikes, their purpose for riding is to train hand muscles, arm muscles and leg and foot muscles in addition to strengthens heart and lung. But the waist of a rider is not trained. Further, common running machines and exercise machines are used at a same spot, not moving, impossible to enjoy outdoor exercise.

SUMMARY OF THE INVENTION

The purpose of the invention is to offer a waist-twisting leisure bike, which includes a front body frame, a rear body frame and a lateral frame. The lateral frame consists of a first lateral frame connected to the first body frame and a second lateral frame connected to the second body frame, having more than one layer of the frame. The first and the second lateral frame are connected pivotally together and a lock member is provided at the connecting location so as to lock the two frames immovable or unlocked to let them rotate freely to each other. Further, another lock member is provided at the front fork base and the front fork tube to lock the front fork tube immovable or unlock to let it movable, When the two lateral frames are unlocked, a rider can twist the waist to control moving direction of the bike so that a rider can train the waist in riding the bike.

BRIEF DESCRIPTION OF DRAWINGS

This invention will be better understood by referring the accompanying drawings, wherein:

FIG. 7 is a perspective view of a locking device in the unlocked condition in the present invention;

FIG. 8 is a perspective view of the locking device in the locked condition in the present invention;

FIG. 9 is a perspective view of another embodiment of a locking device in the unlocked condition in the present invention; and, FIG. 10 is a perspective view of the other embodiment of a locking device in the locked condition in the present invention.

DETAILED DESCRIPTION OF THE PREFERRED EMBODIMENTS

Figure 1:
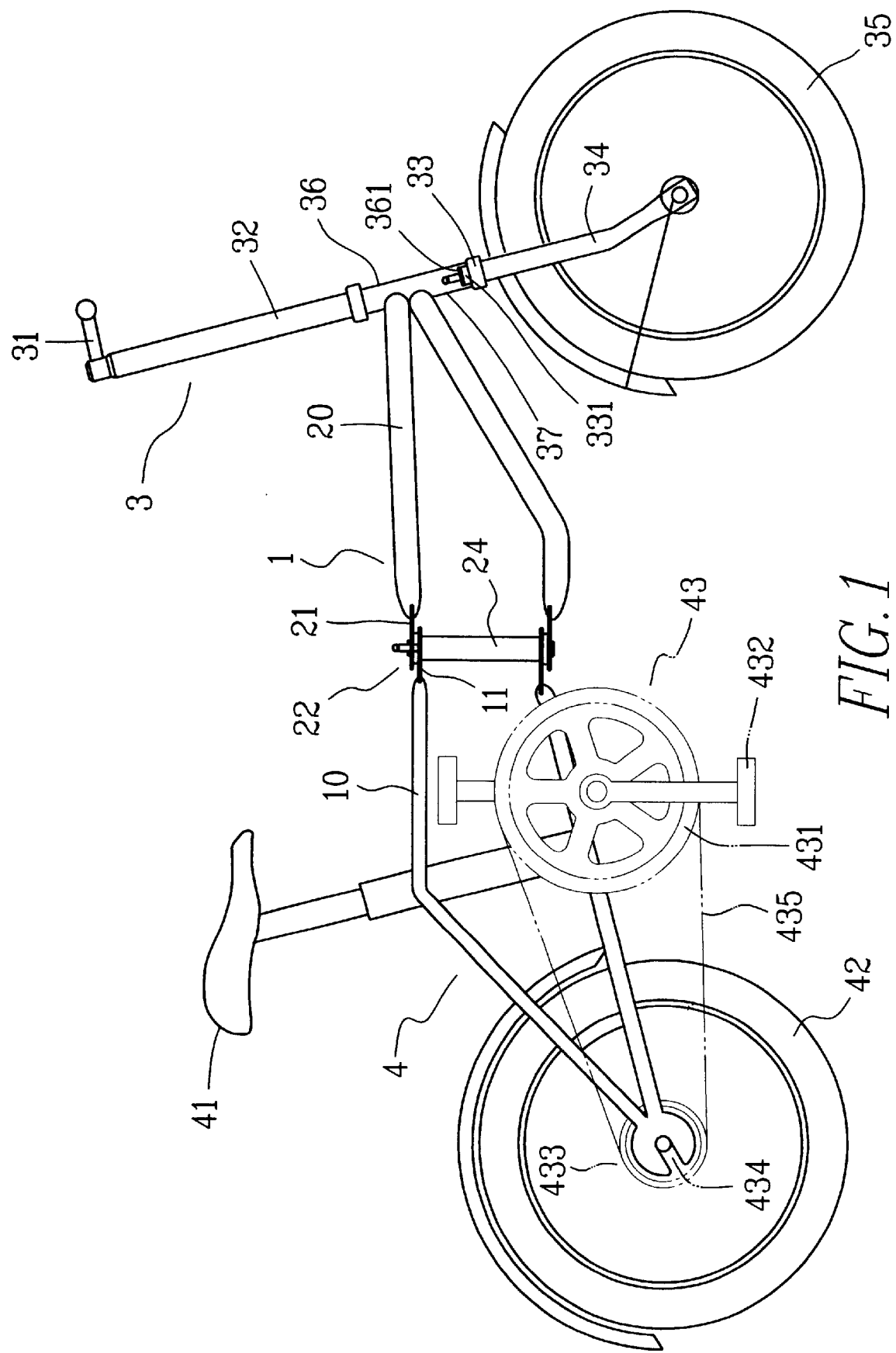
FIG. 1 is a side view of a waist-twisting leisure bike in the present invention.
Figure 2:
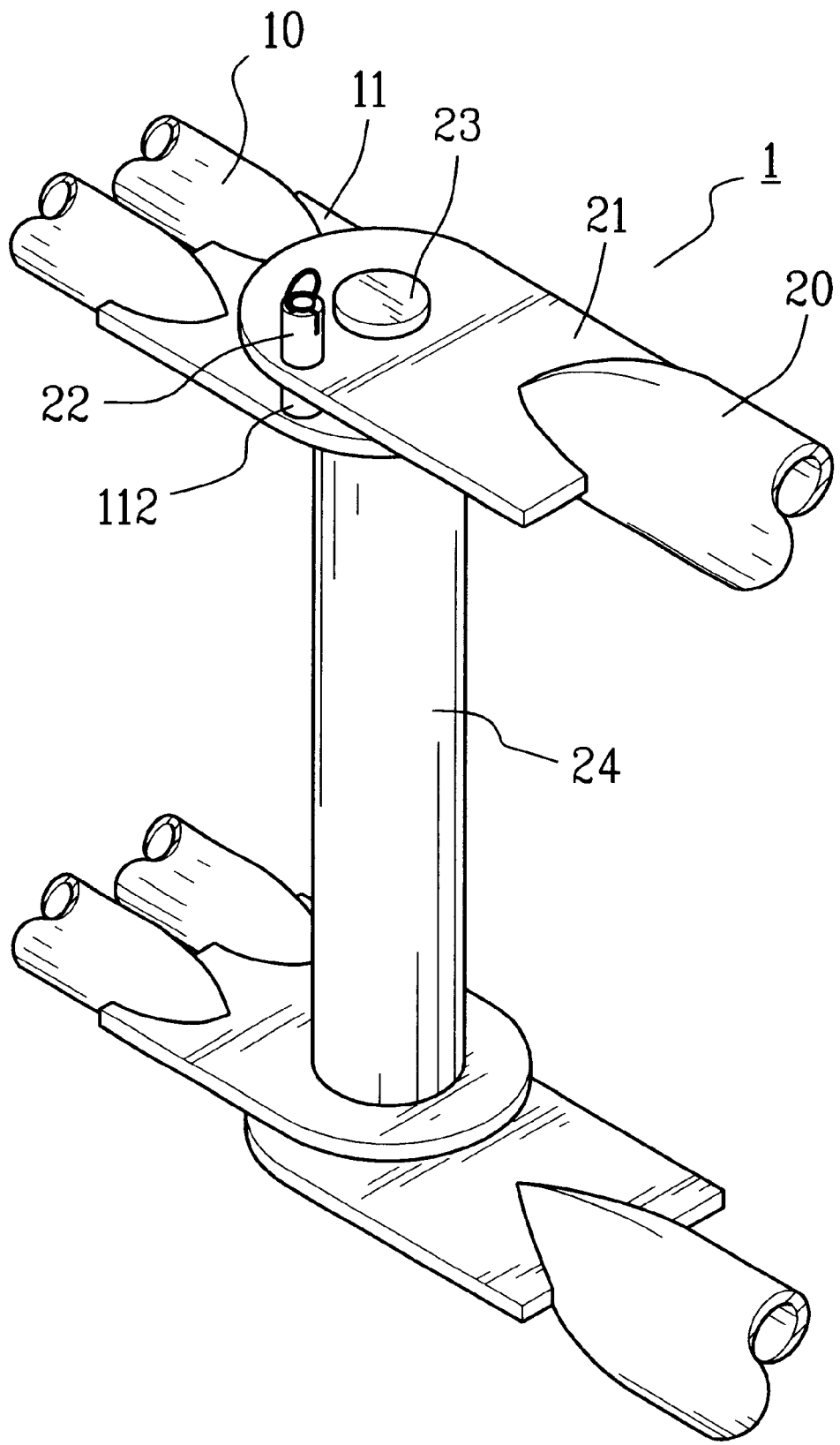
FIG. 2 is a partial perspective view of the waist-twisting leisure bike in the present invention.

A preferred embodiment of a waist-twisting leisure bike in the present invention, as shown in FIGS. 1 and 2, includes a lateral frame 1, a front body frame 3, and a rear body frame 4 as main components combined together.

The front body frame 3 has a support rod 32, a front fork tube 36 fitted around a lower portion of the support rod 32, a front fork base 33 fixed on a lower end of the support rod 32, a front fork 34 connected to the front fork base 33. The handle 31 is connected with the top of the support rod 32, and the front wheel 35 is pivotally provided between the two portions of the front fork 34. seat 41, and a rear wheel 42

Figure 6:
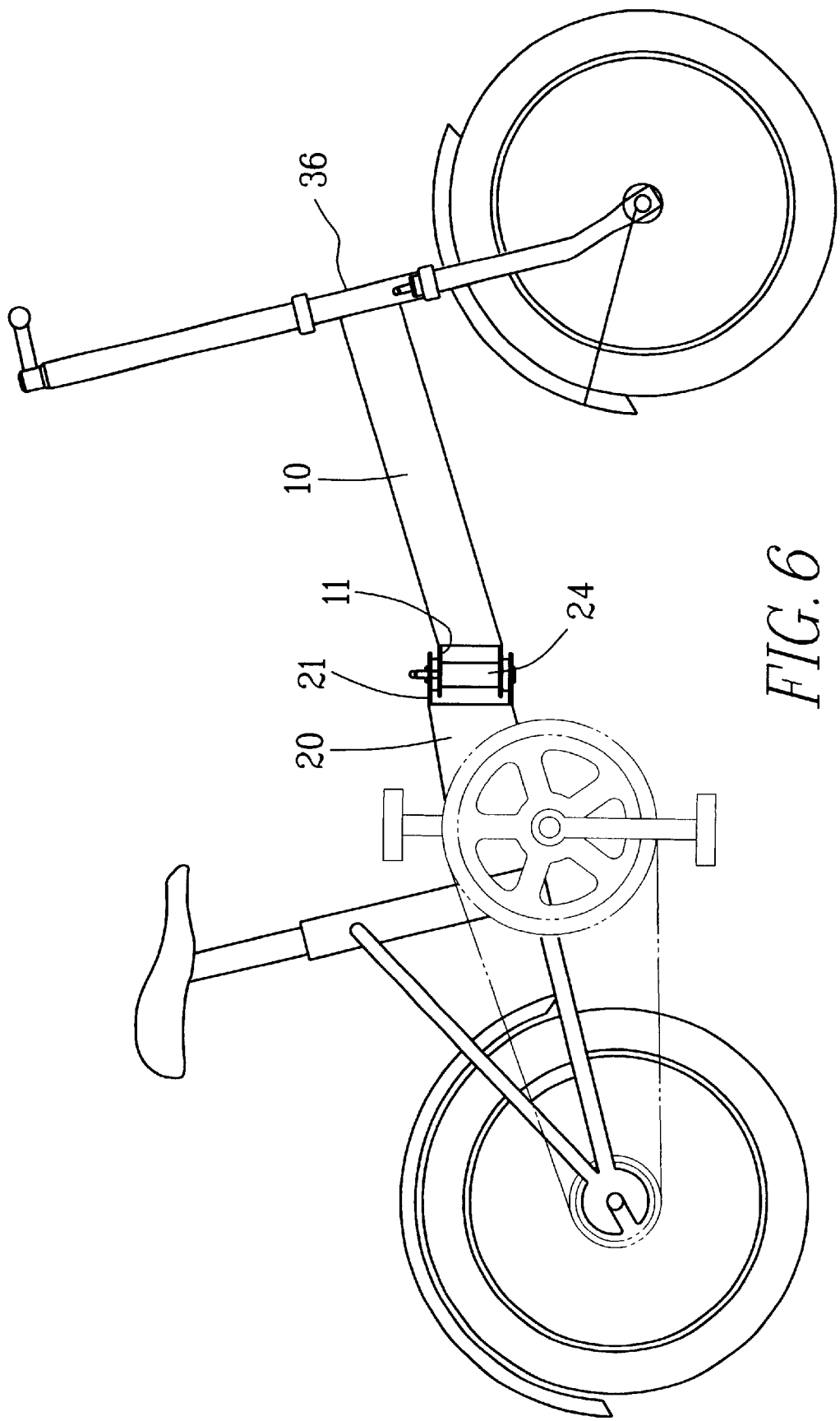
FIG. 6 is a side view of a second embodiment of a waist-twisting leisure bike in the present invention.

The lateral frame 1 consists of a first lateral frame 10 and a second lateral frame 20 both having two layers and the second lateral frame 20 pivotally connected to the first lateral frame 10 to permit the first and the second lateral frame sway separately to each other. The front end of the second lateral frame 20 is connected to a front fork tube 36 as shown in FIG. 1, or the front end of the first lateral frame 10 is connected to the front fork tube 36 as shown in FIG. 6.

Figure 5:
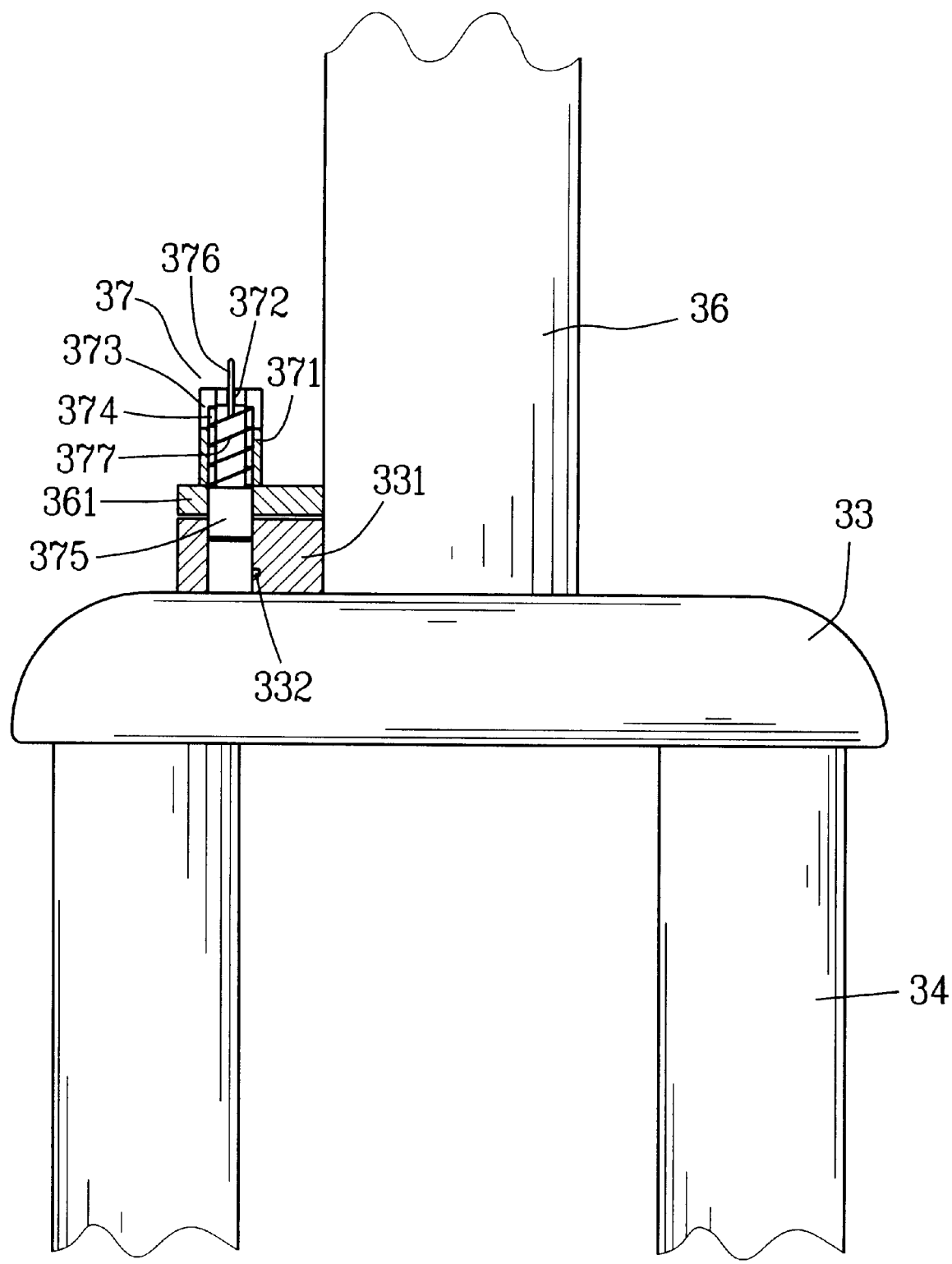
FIG. 5 is a cross-sectional view of a front fork tube provided with a locking device in the present invention.

The front fork tube 36 has a wing member 361 extending out from an outer surface, and a lock member 37 is fixed on the wing member 361. As shown in FIG. 5, the lock member 37 consists of a base 371, a spring 377, and locking rod 375. The base 371 has a groove 373 in an upper end, a chamber 374 in its interior, a through hole 372 bored in an upper wall and having a diameter smaller than the inner diameter of the chamber 374. The chamber 374 communicates with the wing 361. The locking rod 375 has two stages of different diameters, with the small diameter portion fitted around by the spring 377 and protruding out of the through hole 372, and a pull ring 376 connected with the upper end of the locking rod 375.

The front fork base 33 has a lock base 331 bored with a position hole 332 facing the wing member 361. Then the lock member 37 can lock the front fork base 33 impossible to rotate.

Next, as shown in FIG. 1, the rear body frame 4 is combined with a seat 41, the rear wheel 42 and the driving device 43. The driving device 43 consists of a large gear 431, a small gear 433, and a chain 435 extending around the two gears 431, 433. The large gear 431 is pivotally connected with the shaft of a pedal 432 and the small gear is pivotally connected to the shaft of a flywheel 434 and the rear wheel 42.

Figure 3:
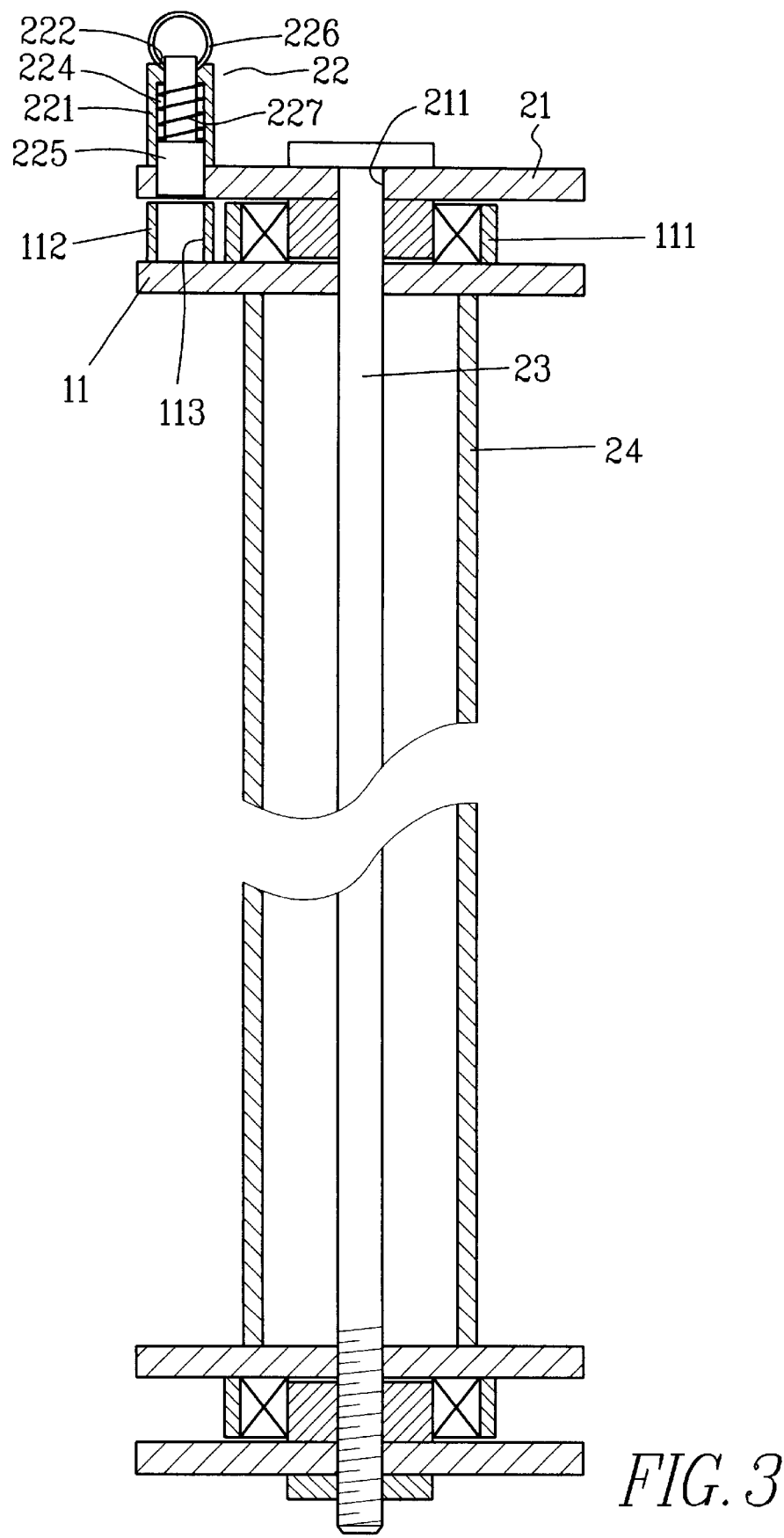
FIG. 3 is a partial cross-sectional view of the waist-twisting leisure bike in the present invention.

As shown in FIGS. 2 and 3, the first and the second lateral framed 10 and 20 have a structure of two layers and are respectively connected pivotally with two pivot plates 11, 21 and a pivot tube 24 provided between the two pivot plates 11, 21. The pivot plate 11 is provided with a bearing 111 and a locking base 112 with a position hole 113 located beside the bearing 111. The pivot plate 21 has a through hole 211 facing the center of the bearing 111, a pivot 23 passing through the through hole 211, the center of the bearing 111, and pivotally connected to the first and the second lateral frame 10 and 20, protruding through the two layers of the first and the second lateral frame 10 and 20 and secured with a nut or C-shaped locking ring.

Figure 4:
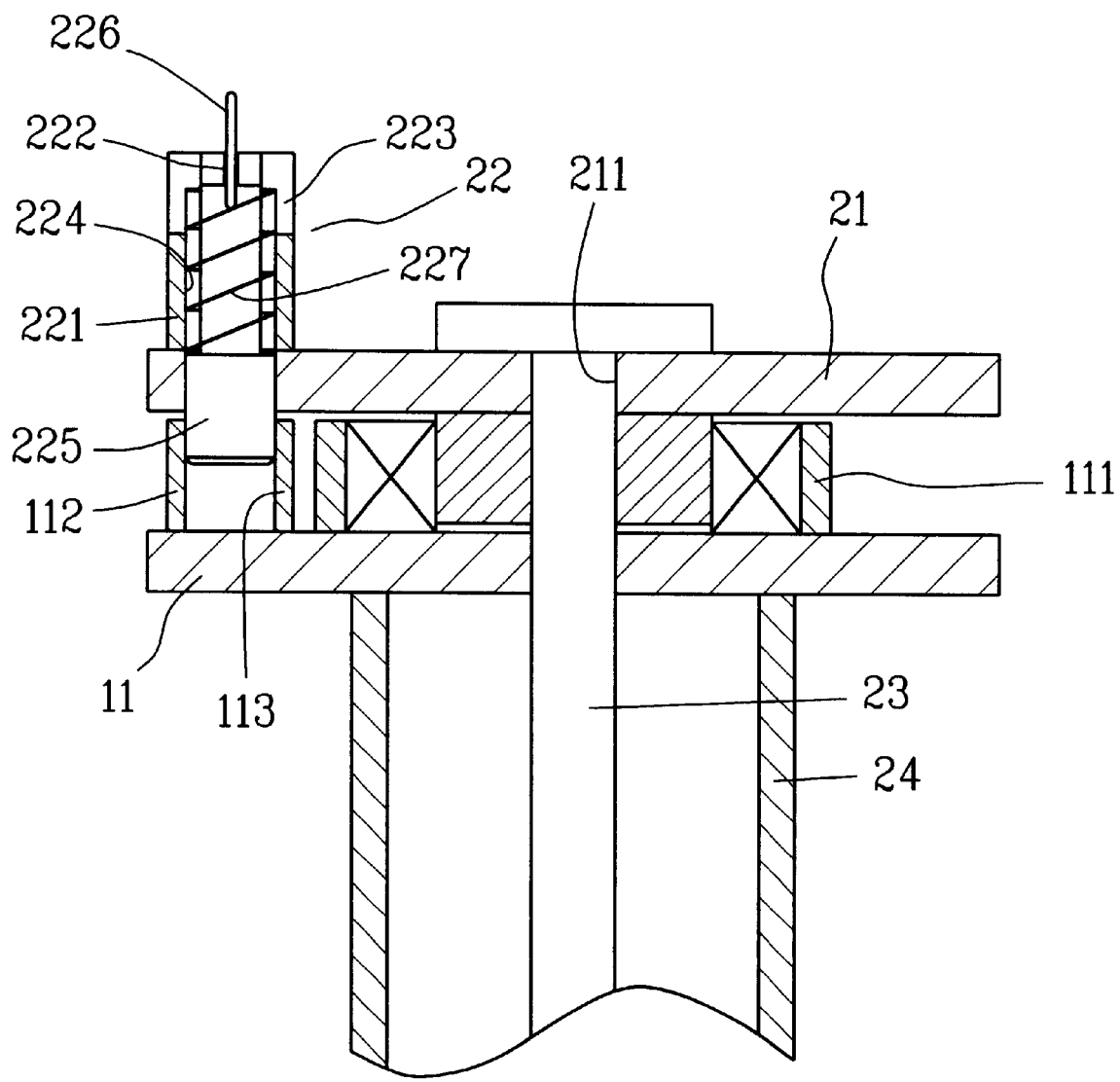
FIG. 4 is another partial cross-sectional view of the waist-twisting leisure bike in the present invention.

Further, another lock member 22 is provided on the lock base 112 of the pivot plate 11, having a base 221, a spring 227, and a locking rod 225. The base 221 has a groove 223, as shown in FIG. 4, a chamber 224 in an interior, and a through hole 222 having a smaller diameter than the inner diameter of the chamber 224. The chamber 224 communicates with the pivot plate 21, and the locking rod 225 has two stages of different diameters, with the small diameter portion fitted around by the spring 227. The locking rod 225 protrudes out of the through hole 222, and a pull ring 226 is connected with the top of the locking rod 225.

If the leisure bike in the invention is to be used for waist twisting, referring to FIGS. 3, 4, 7 and 8, pull up the pull ring 226 of the lock member 22 of the second lateral frame 20 out of the groove 223 of the base 221, and rotate it for an angle to let the pull ring 226 rest on an edge of the through hole 222. Then the end of the locking rod 225 disengages from the position hole 113, permitting the first lateral frame 10 and the second lateral frame 20 sway freely with the pivot 23. At this time, the pull ring 376 of the lock member 37 of the front fork tube 36 has to be placed in the groove 373 so that the locking rod 375 may extend in the position hole 332 of the lock base 331, as shown in FIGS. 5, 9 and 10. Then the front fork base 33 and the front fork tube 36 are locked, preventing the handle 31 from controlling the front wheel 35 in changing direction. So a rider of the bike can hold the handle 31 to pedal to move the bike forward. If the moving direction of the bike is to be changed, the rider can twist the hip, forcing the hip move the seat 41 to let the first and the second lateral frame 10 and 20 sway to each other. Then the first and the second lateral frame 10 and 20 can be changed in their swaying angle, thus changing also the moving direction of the bike. Thus, the bike in the invention can train the waist of a rider and perception of balance, enhancing exercise effect.

Next, locking the lock member 22 of the second lateral frame 20 can position the pull ring 226 in the groove 223, forcing the locking rod 225 insert in the position hole 113 of the locking base 112, and fixing firmly the first and the second body frame 10 and 20 immovable as shown in FIGS. 4 and 8. Then the lock member 37 of the front fork tube is unlocked as shown in FIG. 9, permitting the front fork base rotate freely, let the bike usable as a common bike. So the bike in the invention has versatile usage.

In addition, a lateral frame of different structure may be used in a bike in the invention. FIG. 1 shows a lateral frame having two layers, and FIG. 6 shows a lateral frame of a single layer.

So the waist-twisting leisure bike in the invention has a feature that it includes a first and second lateral frame of two layers and pivotally connected with a pivot, and a lock member provided with the front fork tube and another lock member provided with the pivotal plates so as to change operating modes of a bike. The lock member of the front fork tube can lock the front fork base immovable, and the locking member of the pivotal plates can permit the first and the second lateral frame sway respectively to each other. So the bike in the invention can permit a rider to perform waist twisting in controlling the moving direction of the bike.

I claim:

1. A waist-twisting leisure bike comprising a front body frame, a rear body frame and a lateral frame:

said front body frame provided with a handle, a support rod, a front fork tube, a front fork base, a front fork and a front wheel;

said rear body frame provided with a driving device, a seat, and a rear wheel;

said lateral frame comprising a first lateral frame and a second lateral frame, said first and said second lateral frames connected by pivot plates, said pivot plate of said first lateral frame having a bearing, said pivot plate of said second lateral frame having a through hole, a pivot extending in said through hole and a center of said bearing to pivotally connect said two pivot plates, a lock member provided at the pivotally connected location, another lock member provided between said front fork tube and said front fork base, said first and said second lateral frames unlocked to sway respectively to each other and said front fork tube and said front fork base locked to keep said handle immovable by handling said two lock members so that a rider of said bike can twist the waist in controlling a moving direction of the bike; and wherein said lock members respectively have a base with a groove formed in an upper end thereof, a chamber formed in an interior thereof, a through hole bored in an upper portion thereof, and a locking rod having two sections of different diameters and a pull ring connected to a top of said locking rod, and a lock base having a position hole, one of said lock members being in a locked condition when said pull ring is positioned in said groove of said base and said locking rod inserts in said position hole of said lock base, another of said lock members being in an unlocked condition when said pull ring is pulled up to disengage from said groove and said locking rod separates from said position hole of said lock base.

* * * * *